US012723182B2

(12) United States Patent
Kujirai et al.

(10) Patent No.: US 12,723,182 B2
(45) Date of Patent: Sep. 1, 2026

(54) AQUEOUS ADHESIVE FOR RUBBER

(71) Applicant: SUMITOMO RUBBER INDUSTRIES, LTD., Kobe (JP)

(72) Inventors: Yuko Kujirai, Kobe (JP); Takehiko Hyodo, Kobe (JP); Hiroaki Tanaka, Kobe (JP); Kazuyoshi Shiga, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 1003 days.

(21) Appl. No.: 17/847,480

(22) Filed: Jun. 23, 2022

(65) Prior Publication Data

US 2023/0026920 A1 Jan. 26, 2023

(30) Foreign Application Priority Data

Jul. 14, 2021 (JP) ................................ 2021-116342

(51) Int. Cl.

*C09J 107/02* (2006.01)
*A63B 39/08* (2006.01)
*A63B 102/02* (2015.01)
*C08K 3/22* (2006.01)
*C08K 5/06* (2006.01)
*C08K 5/44* (2006.01)
*C09J 109/08* (2006.01)

(52) U.S. Cl.

CPC ............ *C09J 107/02* (2013.01); *A63B 39/08* (2013.01); *C08K 3/22* (2013.01); *C08K 5/06* (2013.01); *C08K 5/44* (2013.01); *C09J 109/08* (2013.01); *A63B 2102/02* (2015.10); *A63B 2209/10* (2013.01); *C08K 2003/2296* (2013.01); *C09J 2407/00* (2013.01); *C09J 2409/00* (2013.01)

(58) Field of Classification Search

None

See application file for complete search history.

(56) References Cited

U.S. PATENT DOCUMENTS

| | | | | |
|---|---|---|---|---|
| 12,344,770 | B2 * | 7/2025 | Hyodo | C09J 109/08 |
| 12,415,902 | B2 * | 9/2025 | Hyodo | C09J 123/22 |
| 2020/0109318 | A1 * | 4/2020 | Hyodo | A63B 39/00 |
| 2022/0275257 | A1 * | 9/2022 | Hyodo | A63B 39/08 |

FOREIGN PATENT DOCUMENTS

| | | | |
|---|---|---|---|
| JP | 2004-148022 A | | 5/2004 |
| JP | 2008049094 A | * | 3/2008 |
| JP | 2020-59838 A | | 4/2020 |

OTHER PUBLICATIONS

JP 2008049094 A, machine translation, 2008 (Year: 2008).*

* cited by examiner

*Primary Examiner* — Satya B Sastri

(74) *Attorney, Agent, or Firm* — Birch, Stewart, Kolasch & Birch, LLP

(57) ABSTRACT

An aqueous adhesive for rubber of the present disclosure includes: a base agent containing rubber latex as a main component thereof; and an organic solvent that causes swelling of a rubber component in the rubber latex. An amount of the organic solvent in the aqueous adhesive for rubber is not less than 25% by mass and not greater than 60% by mass of a total amount of the base agent and the organic solvent. A boiling point of the organic solvent is preferably not higher than 140° C. A tennis ball of the present disclosure includes a hollow core made of a rubber material. The hollow core includes two hemispherical half cores. The two half cores are adhered to each other by using the aqueous adhesive for rubber.

8 Claims, 2 Drawing Sheets

AQUEOUS ADHESIVE FOR RUBBER

CROSS-REFERENCE TO RELATED APPLICATION

This application claims priority to and the benefit of Japanese Patent Application No. 2021-116342, filed on Jul. 14, 2021, the entire disclosure of which is incorporated herein by reference.

BACKGROUND OF THE INVENTION

Field of the Invention

The present specification discloses an aqueous adhesive. More specifically, the present specification discloses an aqueous adhesive for use in adhering rubber materials.

Description of the Related Art

In the production of a rubber product, there may be a case where a plurality of members each made of a rubber material (hereinafter, also referred to as "rubber members") need to be adhered to each other, or there may be a case where a rubber member needs to be adhered to, for example, a fibrous member or a metal member. One example of a rubber product that is obtained by adhering a plurality of rubber members to each other is a tennis ball. A tennis ball includes a hollow core. The outer peripheral surface of the core is covered with two pieces of dumbbell-shaped melton (felt). A seam portion is formed in a gap between the two pieces of the melton.

Normally, the core is formed by adhering two hemispherical half cores to each other. An adhesive is used for adhering the two half cores to each other. The adhesive is used also for adhering the melton to the outer peripheral surface of the core. Seam glue made of a rubber composition is used for forming the seam portion.

Conventionally, in light of affinity with rubber materials and also in light of adhesive strength, a solvent-based adhesive has been used, which is obtained by dissolving a rubber component, a vulcanizing agent, a vulcanization accelerator, etc., in an organic solvent such as naphtha. For example, Japanese Laid-Open Patent Application Publication No. 2004-148022 (Patent Literature 1) discloses solvent-based seam glue that is obtained by dissolving a rubber composition in an organic solvent such as naphtha. The rubber composition contains, for example, base rubber such as natural rubber, titanium oxide, and sulfur.

Normally, a solvent-based adhesive for use on rubber is obtained in a liquid form in the following manner: kneading solid rubber such as natural rubber together with a filler, a vulcanization accelerator, and so forth by a mixer to reduce the molecular weight of the solid rubber; and dissolving the resulting kneaded mixture in an organic solvent for liquefaction. A large amount of the organic solvent is necessary to dissolve the kneaded mixture in the organic solvent. The organic solvent is highly volatile. Therefore, in a work environment where the adhesive is used, a worker is exposed to the volatilizing solvent. Moreover, reflecting the growing concern for the environment in recent years, there has been a demand for reduction in the use of volatile organic compounds (VOC).

Japanese Laid-Open Patent Application Publication No. 2020-059838 (Patent Literature 2) proposes an aqueous adhesive containing rubber latex and a sulfenamide-based vulcanization accelerator as an adhesive for a tennis ball to replace a solvent-based adhesive. The proposed aqueous adhesive is used for adhering the half cores to each other by vulcanization adhesion.

According to an aqueous adhesive containing no organic solvent as proposed by Patent Literature 2, there is a case where sufficient adhesive strength is not obtained from the adhesive at the time of the vulcanization adhesion, which may cause a failure in adhesion between the rubber members. Thus, there still is a problem in terms of stable production.

It is the intention of the applicant to provide an aqueous adhesive for rubber, the adhesive exerting stable adhesive strength.

SUMMARY OF THE INVENTION

The applicant conducted diligent studies, and as a result of the studies, the applicant has found that an adhesion failure between an aqueous adhesive and a rubber member is caused due to low affinity between the aqueous adhesive and the rubber member. Further, the applicant has found that by using, in the aqueous adhesive, an organic solvent that causes swelling of a rubber component in the aqueous adhesive, the affinity between the aqueous adhesive and the rubber member is improved significantly. Then, consequently, the applicant has completed an aqueous adhesive for rubber, which is disclosed herein.

Specifically, the aqueous adhesive for rubber includes: a base agent containing rubber latex as a main component thereof; and an organic solvent that causes swelling of a rubber component in the rubber latex. A usage amount of the organic solvent is not less than 25% by mass and not greater than 60% by mass of a total amount of the base agent and the organic solvent.

According to the above aqueous adhesive for rubber, owing to the organic solvent, which causes swelling of the rubber component in the rubber latex, the affinity of the aqueous adhesive with an adhesion surface of a rubber material is improved. According to the aqueous adhesive, in vulcanization adhesion between rubber materials, sufficient adhesive strength can be obtained with a less usage amount of organic solvent as compared to conventional products.

DESCRIPTION OF THE PREFERRED EMBODIMENTS

Figure 1:
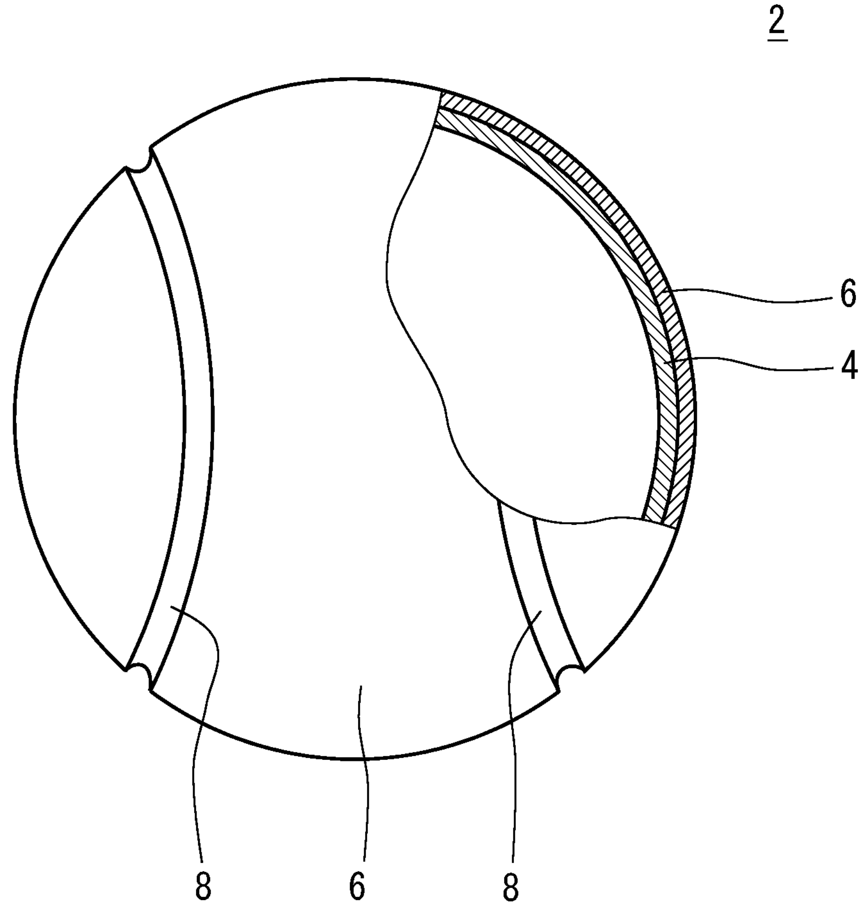
FIG. 1 is a partially cutaway cross-sectional view of a tennis ball that is obtained by using an adhesive according to one embodiment of the present disclosure.

Hereinafter, preferred embodiments of the present disclosure are described in detail with reference to the accompanying drawings as necessary. In the present specification, a range of "X to Y" means "not less than X and not greater than Y" Also, in the present specification, a test temperature is always a room temperature (20° C.±5° C.) unless otherwise specified.

An aqueous adhesive for rubber according to one embodiment includes: a base agent containing rubber latex as a main component thereof; and an organic solvent that causes swelling of a rubber component in the rubber latex. The usage amount of the organic solvent in the aqueous adhesive for rubber is not less than 25% by mass and not greater than 60% by mass of the total amount of the base agent and the organic solvent. It should be noted that, in the present specification, the term "main component" means a component whose amount is normally not less than 50% by mass, preferably not less than 60% by mass, and more preferably not less than 75% by mass.

In a step of adhering rubber members to each other, first, the organic solvent is applied to an adhesion surface of each rubber member. Then, the base agent containing rubber latex as a main component thereof is applied to the adhesion surface of each rubber member, to which the organic solvent has been applied. Thereafter, leaching (washing) is performed thereon. Next, the adhesion surface of one rubber member and the adhesion surface of the other rubber member are adhered together, which are then heated and pressurized. The heating and the pressurization cause a vulcanization reaction of a rubber component derived from the rubber latex. The adhesive is cured due to the vulcanization reaction of the rubber component, and as a result, the rubber members are joined together. As it is clearly understood from a method of using the aqueous adhesive for rubber, which will be described above, the aqueous adhesive for rubber of the present disclosure is a two-component adhesive that is substantially made of the base agent and the organic solvent.

On the adhesion surface of each rubber member, rubber molecules in the rubber latex get swollen as a result of coming into contact with the organic solvent applied to the adhesion surface. The organic solvent causes not only swelling of the rubber component in the rubber latex, but also swelling of the rubber member that is to be adhered. On the adhesion surface to which the organic solvent and the base agent have been applied, these swollen rubbers contact each other, and thereby entanglement of rubber molecules occurs. Consequently, the affinity between the aqueous adhesive and the rubber member is improved. Then, on the adhesion surface, the vulcanization reaction progresses while the entanglement of rubber molecules is occurring. As a result, high adhesive strength is obtained.

Since the organic solvent of the aqueous adhesive for rubber is directly applied to the adhesion surface of the rubber member, the rubber component of the adhesion surface can be made swollen even with an extremely small amount of the organic solvent. This makes it possible to significantly improve the adhesive strength of the rubber member with the use of the organic solvent in such an amount as not to cause any load on the environment and on a worker using the adhesive.

In the description herein, the term "rubber latex" means an emulsion in which a rubber component in particulate form is dispersed in a dispersion medium such as water or aqueous solution. The base agent whose main component is rubber latex contains water as a non-solid component. In the aqueous adhesive for rubber, in which the usage amount of the organic solvent is not less than 25% by mass and not greater than 60% by mass of the total amount of the base agent and the organic solvent, the usage amount of the organic solvent is less than in a conventional solvent-based adhesive. In a conventional solvent-based adhesive, an organic solvent is used as a dispersion medium or as a solvent. For this reason, there is limitation in reducing the usage amount of the organic solvent. On the other hand, in the aqueous adhesive for rubber according to the present disclosure, water is used as a dispersion medium. This makes it possible to reduce the proportion of the usage amount of the organic solvent to the amount of the entire adhesive.

The concentration of the total solid content in the base agent is not particularly limited, so long as the effects of the aqueous adhesive for rubber are obtained. In light of adhesive strength, the solid content concentration in the base agent is preferably not less than 40% by mass, more preferably not less than 45% by mass, and yet more preferably not less than 50% by mass. In light of fluidity and in order to reduce the load on the worker using the adhesive, the solid content concentration in the base agent is preferably not greater than 65% by mass, more preferably not greater than 60% by mass, and particularly preferably not greater than 55% by mass.

In order to improve the adhesive strength, the usage amount of the organic solvent is preferably not less than 27% by mass and more preferably not less than 30% by mass of the total amount of the base agent and the organic solvent. In order to reduce the load on the environment as well as the load on the worker using the adhesive, and in order to improve the workability of the adhesive, the usage amount of the organic solvent is not greater than 60% by mass, preferably not greater than 55% by mass, and more preferably not greater than 53% by mass of the total amount of the base agent and the organic solvent.

The organic solvent is not particularly limited to a specific kind of organic solvent, so long as the organic solvent can cause swelling of the rubber component in the rubber latex. Examples of the organic solvent include: aliphatic hydrocarbons, such as n-hexane, isohexane, and cyclohexane; aromatic hydrocarbons, such as toluene and xylene; rubber solvents; naphtha; and petroleum fractions having a boiling point within the range of 80 to 160° C. Two or more kinds of organic solvents may be used in combination. An organic solvent having a boiling point of not higher than 140° C. is preferable since such an organic solvent is unlikely to remain after the vulcanization adhesion. The organic solvent may contain additives such as a surfactant and a thickener, so long as the effects of the aqueous adhesive for rubber are not inhibited.

The rubber latex serving as the main component of the base agent is not particularly limited to a specific kind of rubber latex, so long as the effects of the aqueous adhesive for rubber are obtained. The rubber latex may be solid rubber latex or liquid rubber latex. Solid rubber latex and liquid rubber latex may be used in combination. In order to achieve high adhesive strength, solid rubber latex is preferable. It should be noted that the term "liquid rubber" means rubber having fluidity at normal temperature under atmospheric pressure, and the term "liquid rubber latex" means an emulsion in which the liquid rubber in particulate form is dispersed in a dispersion medium. The term "solid rubber" means rubber having no fluidity at normal temperature under atmospheric pressure, and the term "solid rubber latex" means an emulsion in which the solid rubber in particulate form is dispersed in a dispersion medium.

The rubber component in the rubber latex is not particularly limited to a specific kind of rubber component. Natural rubber and/or synthetic rubber may be suitably used as the rubber component. The natural rubber may be depolymerized natural rubber. Examples of the synthetic rubber include acrylonitrile-butadiene rubber, chloroprene rubber, butadiene rubber, isoprene rubber, isobutylene-isoprene rubber, ethylene-propylene rubber, and modified products thereof. Examples of the modified products include rubber modified with a functional group, such as a carboxyl group, an amine group, or a hydroxyl group. Two or more kinds of rubber components may be used in combination. In light of adhesive strength, natural rubber and/or depolymerized natural rubber are preferable.

In light of miscibility with various kinds of additive slurries, which will be described below, the solid content concentration in the rubber latex is preferably not greater than 65% by mass, and more preferably not greater than 60% by mass. In light of adhesive strength, the solid content concentration in the rubber latex is preferably not less than 45% by mass, and more preferably not less than 50% by mass. The solid content concentration in the rubber latex is determined in compliance with the method described in JIS K6387-2 "Latex, rubber-Determination of total solids content."

The base agent may contain a vulcanization accelerator as necessary. Examples of the vulcanization accelerator include sulfenamide-based vulcanization accelerators, guanidine-based vulcanization accelerators, thiazole-based vulcanization accelerators, thiuram-based vulcanization accelerators, thiourea-based vulcanization accelerators, dithiocarbamate-based vulcanization accelerators, morpholine-based vulcanization accelerators, aldehyde-amine-based vulcanization accelerators, aldehyde-ammonia-based vulcanization accelerators, imidazoline-based vulcanization accelerators, and xanthate-based vulcanization accelerators. Two or more kinds of vulcanization accelerators may be used in combination. Sulfenamide-based vulcanization accelerators are preferable.

One preferable example of a sulfenamide-based vulcanization accelerator is a compound represented by the following general formula: $R^9$—S—N (−$R^{10}$)—$R^{11}$. In the general formula, $R^9$, $R^{10}$, and $R^{11}$ each independently represent a hydrogen atom, a straight-chain, branched-chain, or cyclic alkyl group having 3 to 20 carbon atoms, an alkylether group having 3 to 20 carbon atoms, an alkylphenyl group having 3 to 20 carbon atoms, a nitrogen-containing heterocyclic group having 3 to 20 carbon atoms, a sulfur-containing heterocyclic group having 3 to 20 carbon atoms, or a nitrogen-and-sulfur-containing heterocyclic group having 3 to 20 carbon atoms.

Specific examples of the above compound include N-cyclohexyl-2-benzothiazole sulfenamide, N-tert-butyl-2-benzothiazole sulfenamide, N,N'-dicyclohexyl-2-benzothiazolyl sulfenamide, N-oxydiethylene-2-benzothiazole sulfenamide, N,N-diisopropyl-2-benzothiazole sulfenamide, and N-ethyl-2-benzothiazole sulfenamide. The compound is more preferably one or more selected from the group consisting of N-cyclohexyl-2-benzothiazole sulfenamide, N-tert-butyl-2-benzothiazole sulfenamide, and N-oxydiethylene-2-benzothiazole sulfenamide.

In light of adhesive strength, the amount of the vulcanization accelerator contained in the base agent is preferably not less than 0.1% by mass, more preferably not less than 0.2% by mass, and yet more preferably not less than 0.3% by mass, in terms of solid content. In light of tight adhesion, the amount of the vulcanization accelerator contained in the aqueous adhesive is preferably not greater than 3.9% by mass, more preferably not greater than 3.5% by mass, and yet more preferably not greater than 3.0% by mass, in terms of solid content.

In a case where a sulfenamide-based vulcanization accelerator and another vulcanization accelerator are used in combination, the proportion of the sulfenamide-based vulcanization accelerator to the entire vulcanization accelerators is preferably not less than 80% by mass, more preferably not less than 90% by mass, and particularly preferably not less than 95% by mass.

The base agent may further contain a vulcanizing agent. Preferable examples of the vulcanizing agent include: sulfur such as powdery sulfur, insoluble sulfur, precipitated sulfur, and colloidal sulfur; and sulfur compounds such as morpholine disulfide and alkylphenol disulfide. The amount of the vulcanizing agent in the base agent is not particularly limited. However, in light of adhesive strength, the amount of the vulcanizing agent in the base agent is preferably not less than 0.1% by mass, more preferably not less than 0.5% by mass, and particularly preferably not less than 2.8% by mass, in terms of solid content. In order to achieve a proper cure rate, the amount of the vulcanizing agent in the base agent is preferably not greater than 5% by mass in terms of solid content.

The base agent may contain an inorganic filler, so long as the effects of the aqueous adhesive for rubber can be obtained. One inorganic filler, or two or more inorganic fillers, selected from the group consisting of silica, carbon black, calcium carbonate, calcium hydroxide, magnesium hydroxide, talc, mica, diatomaceous earth, titanium oxide, zinc oxide, bismuth oxide, barium sulfate, magnesium carbonate, and alumina is/are preferable. The amount of the inorganic filler in the base agent is not particularly limited. However, in light of adhesiveness to an adhesion surface, the amount of the inorganic filler in the base agent is preferably not less than 0.1% by mass, more preferably not less than 1.0% by mass, and particularly preferably not less than 10% by mass, in terms of solid content. In light of fluidity, the amount of the inorganic filler is preferably not greater than 40% by mass, and more preferably not greater than 25% by mass, in terms of solid content.

The base agent may further contain various additives, such as a vulcanization acceleration aid, a thickener, a tackifier, an anti-aging agent, an antioxidant, a light stabilizer, a softener, a processing aid, and a colorant, so long as the effects of the aqueous adhesive for rubber are not inhibited.

In light of adhesiveness to an adhesion surface, the viscosity of the base agent is preferably not less than 20 cps, more preferably not less than 50 cps, and particularly preferably not less than 200 cps. In light of application properties and fluidity, the viscosity of the aqueous adhesive is preferably not greater than 20,000 cps, more preferably not greater than 10,000 cps, and particularly preferably not greater than 3,000 cps. The viscosity of the base agent is measured in compliance with HS Z8803 "Methods for viscosity measurement of liquid." Specifically, the viscosity of the base agent is measured at a temperature of 23° C.±1° C. by using a Brookfield rotational viscometer (TVC-10 viscometer available from TOKI SANGYO CO., LTD.).

In light of the stability of the latex, the pH of the base agent is adjusted to preferably not less than 7.0 and not greater than 12.0, more preferably not less than 8.0 and not greater than 11.5, and particularly preferably not less than 9.5 and not greater than 10.5. The pH of the base agent is measured at a temperature of 23° C.±1° C. by using a pH meter (TPX-999 available from Toko Kagaku Kenkyusho K. K.).

A method of producing the aqueous adhesive for rubber according to one embodiment includes steps of: (1) preparing dispersion mediums, each by adding a dispersant to water; (2) obtaining slurries of different respective additives to be blended into rubber latex, by putting the additives into, and mixing the additives with, the respective dispersion mediums and then adjusting the pH of each resulting mixture to not less than 8.0 and not greater than 12.0; (3) obtaining a base agent by adding the slurries of the respective additives to the rubber latex; and (4) preparing an organic solvent that causes swelling of a rubber component in the rubber latex. The amount of the organic solvent to be prepared is not less than 25% by mass and not greater than 60% by mass of the total amount of the base agent and the organic solvent.

Examples of the additives to be blended into the rubber latex include a vulcanizing agent, a vulcanization accelerator, a vulcanization acceleration aid, an inorganic filler, a thickener, an anti-aging agent, an antioxidant, a light stabilizer, a softener, a processing aid, and a colorant.

The dispersion mediums are used for preparing the slurries, in which the respective additives are dispersed. The dispersant used for preparing each dispersion medium is not particularly limited to a specific kind of dispersant. The dispersant is suitably selected for use from among anionic, nonionic, and cationic surfactants in accordance with the kind of the additive to be dispersed and the concentration of the slurry. Examples of the anionic surfactant include alkyl sulfonates having 8 to 20 carbon atoms, alkyl aryl sulfates, sodium naphthalene sulfonate-formaldehyde condensates, and alkali metal salts of rosin acids. Examples of the nonionic surfactant include aromatic polyglycol ethers, polyvinyl alcohol, polyoxyethylene alkyl ethers, and polyoxyethylene monostearates. Examples of the cationic surfactant include dilauryl dimethyl ammonium chloride, hexadecyl trimethyl ammonium chloride, octadecyl trimethyl ammonium chloride, and dodecyl trimethyl ammonium chloride. An anionic or nonionic surfactant is preferable. Two or more kinds of surfactants may be used in combination.

In light of the stability of the slurry, the concentration of the dispersant in the dispersion medium is preferably not less than 0.5% by mass, and more preferably not less than 1.0% by mass. In light of the adhesive strength of the obtained adhesive, the concentration of the dispersant in the dispersion medium is preferably not greater than 20% by mass, and more preferably not greater than 15% by mass.

In light of the dispersion stability of the latex, preferably, the method of producing the aqueous adhesive for rubber further includes a step of adjusting the pH of each dispersion medium to not less than 8.0 and not greater than 12.0. For example, after the dispersant is dissolved in purified water, ammonia water or the like may be added thereto to obtain a predetermined pH, and thereby the dispersion medium may be prepared.

In the method of producing the aqueous adhesive for rubber, the additives are put into the respective dispersion mediums such that the solid content concentration in each dispersion medium is a predetermined concentration. After the pH of each dispersion medium is adjusted to not less than 8.0 and not greater than 12.0, the dispersion medium is uniformly mixed by a ball mill or the like. In this manner, the slurry of each additive is obtained. Thereafter, the obtained slurries of the respective additives are added to, and uniformly mixed with, the rubber latex. In this manner, the base agent of the aqueous adhesive for rubber is obtained. The method of producing the aqueous adhesive for rubber may further include a step of adjusting the solid content concentration in the mixture in which the slurries of the respective additives have been blended with the rubber latex, by adding a diluent such as water to the mixture.

The aqueous adhesive for rubber can be preferably used for producing, for example, tennis balls. FIG. 1 shows a tennis ball 2 obtained by using the aqueous adhesive for rubber according to one embodiment. The tennis ball 2 includes a hollow core 4, two felt portions 6 covering the core 4, and a seam portion 8 positioned in a gap between the two felt portions 6. In general, the thickness of the core 4 is about 3 mm to 4 mm. The inside of the core 4 is filled with compressed gas. The two felt portions 6 are adhered to the surface of the core 4 by the adhesive.

Figure 2A:
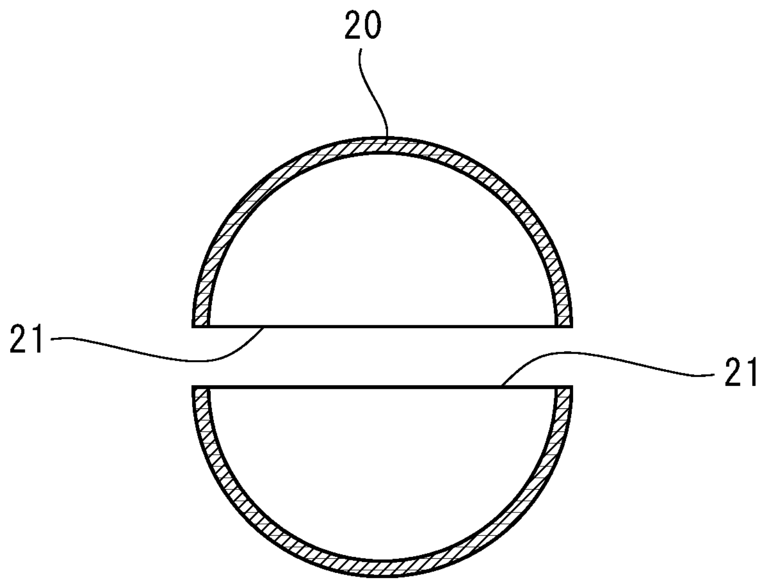
FIGS. 2A and 2B are each a cross-sectional view illustrating a step of forming the core of the tennis ball of FIG. 1.
Figure 2B:
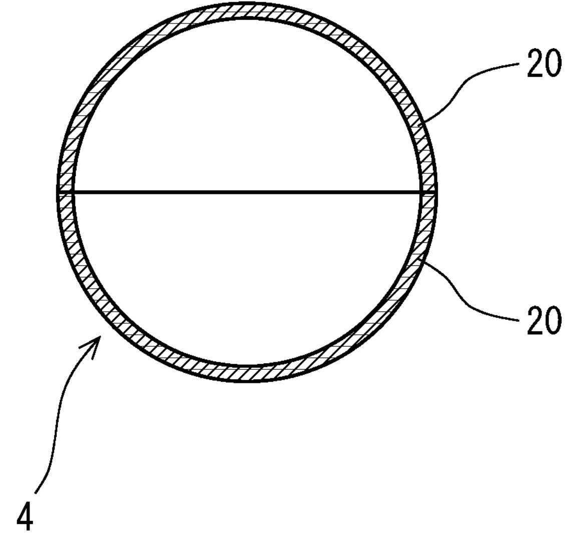

FIGS. 2A and 2B are each a cross-sectional view illustrating a step of forming the core 4 of the tennis ball 2 of FIG. 1. As shown in FIG. 2A, in the step of forming the core 4, first, two half cores 20 are prepared. Each of the half cores 20 is hemispherical-shell-shaped, and includes an annular edge portion 21. Next, the organic solvent that causes swelling of a rubber component is applied to the edge portion 21 of each half core 20. Subsequently, the base agent is applied to each edge portion 21, to which the organic solvent has been applied, and water and tablets of sodium chloride and sodium nitrite are put into one of the half cores 20. Thereafter, as shown in FIG. 2B, the two half cores 20 are adhered to each other at their respective edge portions 21, and thereby a spherical body is formed. The spherical body formed by the two half cores 20 is put into a predetermined mold, heated and pressurized therein, and thereby the hollow core 4 is formed.

According to another aspect of the present disclosure, a method of using the aqueous adhesive for rubber includes: (1) a first step of applying the organic solvent that causes swelling of a rubber component to an adhesion surface of a rubber member; (2) a second step of applying the base agent containing rubber latex as a main component thereof to the adhesion surface to which the organic solvent has been applied; and (3) a third step of heating and pressurizing the organic solvent and the base agent that have been applied to the adhesion surface to crosslink the rubber component in the base agent.

In the first step, the usage amount of the organic solvent is not less than 0.025 $ml/cm^2$ and not greater than 0.14 $ml/cm^2$ with respect to the area of the adhesion surface. Preferably, the usage amount of the organic solvent is not less than 25% by mass and not greater than 60% by mass of the total amount of the base agent and the organic solvent. According to the method of using the aqueous adhesive for rubber, in which the usage amount of the organic solvent is within this range, the affinity between the rubber component in the base agent and the adhesion surface of the rubber member is improved significantly, and stable adhesive strength is exerted. Further, in the third step, the volatilization concentration of the organic solvent is reduced, and thereby the load on the worker using the adhesive and the load on the environment are reduced.

Hereinafter, preferable materials of the core 4 (the half cores 20) included in the tennis ball 2 of the present embodiment are described. It should be noted that the materials of the core 4 (the half cores 20) may be changed, so long as the intention of the applicant is satisfied.

The core 4 is formed by crosslinking a rubber composition. Preferable examples of the base rubber include natural rubber, polybutadiene, polyisoprene, styrene-butadiene copolymers, acrylonitrile-butadiene copolymers, polychloroprene, ethylene-propylene copolymers, ethylene-propylene-diene copolymers, isobutylene-isoprene copolymers, and acrylic rubber. Two or more kinds of base rubbers may be used in combination. The base rubber is more preferably natural rubber.

The rubber composition of the core 4 may contain a vulcanizing agent and a vulcanization accelerator. The vulcanizing agent and the vulcanization accelerator may be suitably selected for use from among the vulcanizing agents and vulcanization accelerators previously mentioned above for the base agent of the aqueous adhesive for rubber. The amounts of the vulcanizing agent and the vulcanization accelerator in the rubber composition of the core 4 are adjusted in accordance with their kinds. In light of rebound performance, the blending amount of the vulcanizing agent is preferably not less than 0.5 parts by mass, and more preferably not less than 1.0 part by mass, with respect to 100 parts by mass of the base rubber. The blending amount of the vulcanizing agent is preferably not greater 5.0 parts by mass. In light of rebound performance, the blending amount of the vulcanization accelerator is preferably not less than 1.0 part by mass, and more preferably not less than 2.0 parts by mass, with respect to 100 parts by mass of the base rubber. The blending amount of the vulcanization accelerator is preferably not greater than 6.0 parts by mass.

The rubber composition of the core 4 may further contain a filler. Preferable examples of the filler include talc, kaolin clay, graphite, graphene, bentonite, halloysite, montmorillonite, mica, beidellite, saponite, hectorite, nontronite, vermiculite, illite, allophane, carbon fiber, carbon nanotube, carbon black, silica, calcium carbonate, magnesium carbonate, and barium sulfate. Among these, talc, kaolin clay, graphite, and graphene are preferable. Two or more kinds of fillers may be used in combination.

The amount of the filler in the rubber composition of the core 4 is suitably adjusted in accordance with the kind of the filler. In light of rebound performance and durability, the amount of the filler is preferably not less than 5 parts by mass, more preferably not less than 10 parts by mass, and particularly preferably not less than 15 parts by mass, with respect to 100 parts by mass of the base rubber. In light of feel at impact, the amount of the filler is preferably not greater than 120 parts by mass, more preferably not greater than 100 parts by mass, and particularly preferably not greater than 80 parts by mass.

The rubber composition of the core 4 may further contain additives such as a vulcanization aid, an anti-aging agent, an antioxidant, a light stabilizer, a softener, a processing aid, and a colorant, so long as the intention of the applicant is not hindered.

A method of producing the rubber composition for the core is not particularly limited, so long as the intention of the applicant is satisfied. For example, the rubber composition may be produced by a method including: obtaining a kneaded mixture by putting and kneading the base rubber and suitably selected additives in a known kneading machine such as a Banbury mixer, a kneader, or a roll; and heating and pressurizing the kneaded mixture. Conditions for kneading and vulcanization are selected in accordance with the blending of the rubber composition for the core. A preferable kneading temperature is not lower than 50° C. and not higher than 180° C. A preferable vulcanization temperature is not lower than 140° C. and not higher than 180° C. A preferable vulcanization time is not less than two minutes and not greater than 60 minutes.

A method of producing the tennis ball 2 including the core 4 obtained by using the rubber composition for the core is also not particularly limited. For example, an adhesive is applied to the back surface of each of the felt portions 6, each of which has previously been cut into a dumbbell shape, and seam glue is applied to the cross-sectional surface of each felt portion 6. Then, these felt portions 6 with the adhesive and the seam glue applied thereto are adhered to the surface of the core 4, and thereby the tennis ball 2 is obtained. Before the felt portions 6 are adhered to the surface of the core 4, the adhesive may be applied to the surface of the core 4. A known adhesive may be suitably selected and used for the adhesion of the felt portions 6, and may be used as the seam glue.

EXAMPLES

The following elucidates the effects of the aqueous adhesive for rubber according to Examples. However, the scope of the disclosure in the present specification should not be restrictively construed based on the description of the Examples.

Example 1

(Production of Aqueous Adhesive for Rubber)

First, 1.6 parts by mass of a sodium naphthalene sulfonate-formaldehyde condensate (trade name "Tamol NN 9104" available from BASF) and 0.6 parts by mass of an aromatic polyglycol ether (trade name "Emulvin WA" available from LANXESS) were dissolved into 100 parts by mass of purified water, and the pH thereof was adjusted by using commercially available ammonia water (28% by mass) to not less than 8.0 and not greater than 12.0. In this manner, a dispersion medium was prepared.

Next, the dispersion medium was added to N-cyclohexyl-2-benzothiazole sulfenamide (CBS; vulcanization accelerator; trade name "SANCELER CM" available from SANSHIN CHEMICAL INDUSTRY CO., LTD.), which was then stirred by a ball mill for 8 hours or more, and thereafter the pH thereof was adjusted by using the aforementioned ammonia water to not less than 8.0 and not greater than 12.0. In this manner, CBS slurry (having a solid content concentration of 20% by mass) was obtained.

Subsequently, 122.4 parts by mass of depolymerized latex (having a solid content concentration of 50% by mass; trade name "DPL-51" available from REGITEX CO., LTD.), 10.2 parts by mass of zinc oxide slurry (having a solid content concentration of 60% by mass; trade name "Disperacc ZnO 60" available from Behn Meyer), 51.0 parts by mass of titanium oxide slurry (having a solid content concentration of 60% by mass; trade name "Dispertint TB60" available from Behn Meyer), 8.4 parts by mass of sulfur slurry (having a solid content concentration of 60% by mass; trade name "Disperacc Sulphur 60" available from Behn Meyer), and 5.9 parts by mass of CBS slurry were added to 102 parts by mass of natural rubber latex (having a solid content concentration of 60% by mass; trade name "Low Ammonia Latex" available from Nomura Trading Co., Ltd.), which was then mixed uniformly. A suitable amount of ammonia water (available from YONEYAMA YAKUHIN KOGYO CO., LTD.) and a suitable amount of pure water were added to the mixture, and thereby a base agent a having a solid content concentration of 50.9% by mass was obtained. The viscosity of the base agent a, measured by the aforementioned method, was 225 cps, and the pH thereof was 10.6. As an organic solvent, a rubber solvent (trade name "LA rubber solvent (G)" available from JXTG Nippon Oil & Energy Corporation; naphtha) was prepared separately.

(Fabrication of Test Core)

100 parts by mass of natural rubber (trade name "SMR CV60" available from Astlett Rubber Inc.), 15 parts by mass of carbon black (trade name "N330" available from Cabot Japan K. K.), 4 parts by mass of silica (trade name "Nipsil VN3" available from Tosoh Silica Corporation), 30 parts by mass of kaolin clay (trade name "ECKALITE 120" available from Imerys S. A.), 17 parts by mass of magnesium carbonate (trade name "KINBOSHI" available from Konoshima Chemical Co., Ltd.), and 5 parts by mass of zinc oxide (trade name "Zinc Oxide II" available from SEIDO CHEMICAL INDUSTRY CO., LTD.) were put into a Banbury mixer, kneaded therein at 90° C. for 5 minutes, and thereby a kneaded mixture was obtained. To the kneaded mixture, the following additives were added: 0.5 parts by mass of salicylic acid (available from Tokyo Chemical Industry Co., Ltd.); 2.3 parts by mass of 1,3-Diphenylguanidine (trade name "SANCELER D" available from SANSHIN CHEMICAL INDUSTRY CO., LTD.); and 3.5 parts by mass of sulfur (the aforementioned trade name "SANFEL EX"). The mixture was kneaded with these additives at 50° C. for 3 minutes by using an open roll, and thereby a rubber composition was obtained.

The obtained rubber composition was put into a mold and subjected to pressing at 140° C. for 4 minutes, and thereby two half cores were formed. The edge portion of each half core was sandpapered (#100). Thereafter, the prepared organic solvent was applied to the edge portion of each half core. Subsequently, the base agent a was applied to each edge portion, to which the organic solvent had been applied. The usage amount of the organic solvent was 52.1% by mass of the total amount of the base agent and the organic solvent (0.136 ml/cm$^2$ with respect to the area of the adhesion surface). Then, in order to wash off the surfactant from the slurry, each half core was washed by water (i.e., leaching), and then after ammonium chloride, sodium nitrite, and water were put into one of the half cores, the two half cores were heated at 150° C. for 6 minutes. In this manner, a test core was fabricated.

Example 2 and Comparative Examples 1 to 2

In each of Example 2 and Comparative Examples 1 to 2, a test core was fabricated in the same manner as in Example 1 except that, in each of Example 2 and Comparative Examples 1 to 2, the usage amount of the organic solvent was as indicated in Table 1 below. In Table 1, the ratio (wt %) of the organic solvent to the total amount of the base agent and the organic solvent, and the usage amount (ml/cm$^2$) of the organic solvent with respect to the area of the adhesion surface, are indicated as "Organic solvent usage amount."

Examples 3 to 4

In each of Examples 3 to 4, a base agent b having a solid content concentration of 50.9% by mass was obtained in the same manner as in the case of obtaining the base agent a, except that in each of Examples 3 to 4, the blending amounts of the rubber latex and the slurries were as follows: 152.8 parts by mass of depolymerized latex (the aforementioned trade name "DPL-51"); 6.4 parts by mass of zinc oxide slurry (the aforementioned trade name "Disperacc ZnO 60"); 31.8 parts by mass of titanium oxide slurry (the aforementioned trade name "Dispertint TB60"); 5.2 parts by mass of sulfur slurry (the aforementioned trade name "Disperacc Sulphur 60"); and 3.7 parts by mass of CBS slurry. The viscosity of the base agent b, measured by the aforementioned method, was 220 cps, and the pH thereof was 10.6. As an organic solvent, a rubber solvent (trade name "LA rubber solvent (G)" available from JXTG Nippon Oil & Energy Corporation; naphtha) was prepared separately In each of Examples 3 to 4, a test core was fabricated in the same manner as in Example 1 except that, in each of Examples 3 to 4, the base agent b was used and the usage amount of the organic solvent was as indicated in Table 1 below.

[Evaluation of Adhesiveness]

12 dumbbell pieces of JIS No. 3 (each having a thickness of 2 mm) were cut out from each of the test cores fabricated in Examples 1 to 4 and Comparative Examples 1 to 2 as test pieces. At the time, each test piece was cut out such that the adhesion surfaces of the two half cores were located at the center portion of the dumbbell piece.

A tensile test was performed on each test piece at a tensile speed of 500 mm/min by using a tensile test machine (trade name "Autograph AGS-X" available from Shimadzu Corporation), and the cross section of each test piece after its breakage was observed. For the 12 test pieces of each example, those in which the base material was broken (broken at a portion different from the adhesion surfaces) were evaluated as exhibiting "good" adhesion, whereas those in which an interfacial failure (breakage at any of the edge portions) or cohesive failure (breakage at the adhesive layer) occurred were evaluated as exhibiting "poor" adhesion. Table 1 below shows the number of, and the ratio (%) of, the test pieces evaluated as exhibiting "good" adhesion.

TABLE 1

| | | Ex. 1 | Ex. 2 | Comp. EX. 1 | Comp. EX. 2 | Ex. 3 | Ex. 4 |
|---|---|---|---|---|---|---|---|
| Base agent | | a | a | a | a | b | b |
| Organic solvent | [wt %] | 52.1 | 25.3 | 0.0 | 16.9 | 52.1 | 25.3 |
| usage amount | [ml/cm$^2$] | 0.136 | 0.042 | 0.000 | 0.025 | 0.136 | 0.042 |
| Evaluation of | Number of "good" adhesion test pieces | 11 | 9 | 0 | 7 | 12 | 12 |
| adhesiveness | Ratio [%] of "good" adhesion test pieces | 92 | 75 | 0 | 58 | 100 | 100 |

As shown in Table 1, according to the aqueous adhesive of each Example, not less than 60% of the test pieces were evaluated as exhibiting "good" adhesion. The evaluation results clearly indicate the superiority of the aqueous adhesive for rubber of the present disclosure.

[Disclosure Items]

The following items each disclose a preferred embodiment.

[Item 1]

An aqueous adhesive for rubber, including: a base agent containing rubber latex as a main component thereof; and an organic solvent that causes swelling of a rubber component in the rubber latex, wherein a usage amount of the organic solvent is not less than 25% by mass and not greater than 60% by mass of a total amount of the base agent and the organic solvent.

[Item 2]

The aqueous adhesive for rubber according to Item 1, wherein a solid content concentration in the base agent is not less than 45% by mass and not greater than 65% by mass.

[Item 3]

The aqueous adhesive for rubber according to Item 1 or 2, wherein a boiling point of the organic solvent is not higher than 140° C.

[Item 4]

The aqueous adhesive for rubber according to any one of Items 1 to 3, wherein the rubber latex is solid rubber latex and/or liquid rubber latex.

[Item 5]

The aqueous adhesive for rubber according to any one of Items 1 to 4, wherein the rubber component in the rubber latex is natural rubber and/or synthetic rubber.

[Item 6]

The aqueous adhesive for rubber according to any one of Items 1 to 5, wherein the base agent contains a vulcanization accelerator, and an amount of the vulcanization accelerator contained in the base agent is not less than 0.1% by mass and not greater than 3.9% by mass in terms of solid content.

[Item 7]

The aqueous adhesive for rubber according to any one of Items 1 to 6, wherein the base agent contains an inorganic filler, and an amount of the inorganic filler contained in the base agent is not less than 0.1% by mass and not greater than 40% by mass in terms of solid content.

[Item 8]

A tennis ball including a hollow core made of a rubber material, wherein the hollow core includes two hemispherical half cores, and the two half cores are adhered to each other by using the aqueous adhesive for rubber according to any one of Items 1 to 7.

The above-described aqueous adhesive for rubber is applicable to the production of various rubber products. The foregoing description is in all aspects illustrative, and various modifications can be made without departing from the essential features disclosed in the present specification.

What is claimed is:

1. A tennis ball comprising a hollow core made of a rubber material, wherein the hollow core includes two hemispherical half cores, the two half cores are adhered to each other by using an aqueous adhesive for rubber, the aqueous adhesive comprising:

a base agent containing rubber latex as a main component thereof, and an organic solvent that causes swelling of a rubber component in the rubber latex, a usage amount of the organic solvent is not less than 25% by mass and not greater than 60% by mass of a total amount of the base agent and the organic solvent, and rubber molecules in the rubber latex of the aqueous adhesive and rubber molecules in the hollow core made of the rubber material are vulcanized in an entangled state on an adhesive surface of each half core.

2. The tennis ball according to claim 1, wherein a solid content concentration in the base agent is not less than 45% by mass and not greater than 65% by mass.

3. The tennis ball according to claim 1, wherein a boiling point of the organic solvent is not higher than 140° C.

4. The tennis ball according to claim 1, wherein the rubber latex is at least one of solid rubber latex and liquid rubber latex.

5. The tennis ball according to claim 1, wherein the rubber component in the rubber latex is at least one of natural rubber and synthetic rubber.

6. The tennis ball according to claim 1, wherein the base agent contains a vulcanization accelerator, and an amount of the vulcanization accelerator contained in the base agent is not less than 0.1% by mass and not greater than 3.9% by mass in terms of solid content.

7. The tennis ball according to claim 1, wherein the base agent contains an inorganic filler, and an amount of the inorganic filler contained in the base agent is not less than 0.1% by mass and not greater than 40% by mass in terms of solid content.

8. The tennis ball according to claim 1, wherein the organic solvent is one or more members selected from the group consisting of n-hexane, isohexane, cyclohexane, toluene, xylene, a rubber solvent, naphtha, and petroleum fractions having a boiling point within a range of 80° C. to 140° C.

* * * * *